No. 645,986. Patented Mar. 27, 1900.
P. WERNICKE.
MEANS FOR FILLING MOLDS.
(Application filed June 26, 1899.)
(No Model.) 3 Sheets—Sheet 1.
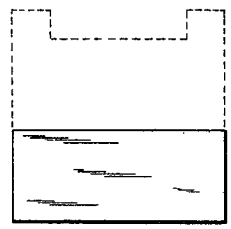
Fig. 1.
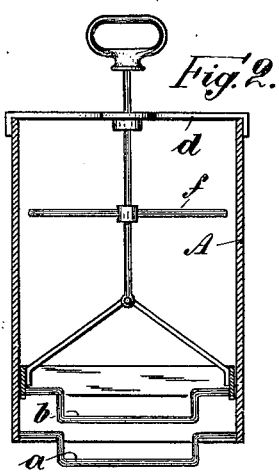
Fig. 2.
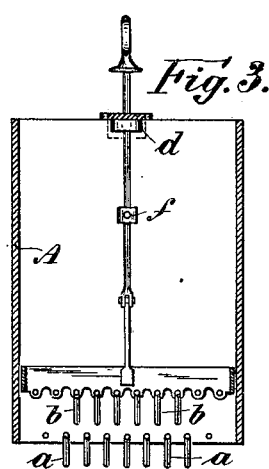
Fig. 3.
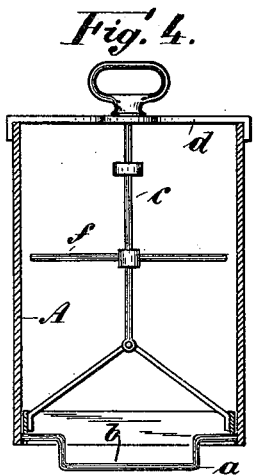
Fig. 4.
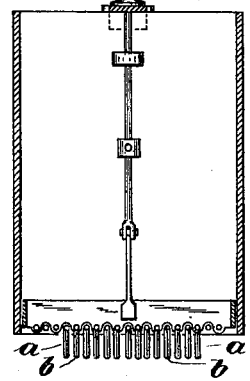
Fig. 5.
Fig. 7.
Fig. 8.  Fig. 9.
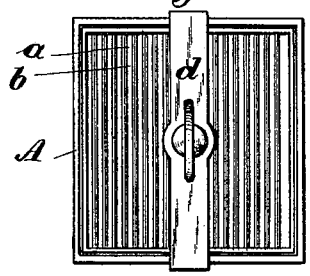
Fig. 6.
Witnesses:
Inventor:
Paul Wernicke
by Eustace + Hopkins
Atty.

No. 645,986. Patented Mar. 27, 1900.
P. WERNICKE.
MEANS FOR FILLING MOLDS.
(Application filed June 26, 1899.)
(No Model.) 3 Sheets—Sheet 2.

Witnesses:
Alfred Weisburg
Hugo Böhme.

Inventor:
Paul Wernicke
by Eustace V. Hopkins
Att'y.

No. 645,986. Patented Mar. 27, 1900.
P. WERNICKE.
MEANS FOR FILLING MOLDS.
(Application filed June 26, 1899.)
(No Model.) 3 Sheets—Sheet 3.
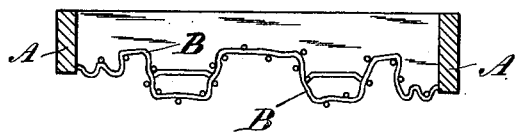
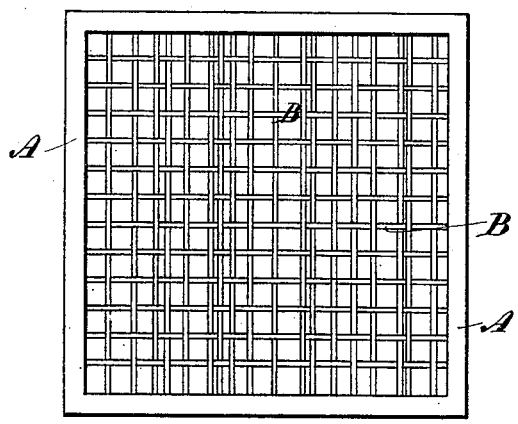
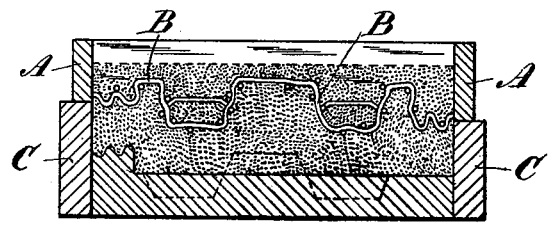
Witnesses:
Alfred Wirking
Hugo Böhme
Inventor:
Paul Wernicke
by: Eustace W. Hopkins
Att'y.

UNITED STATES PATENT OFFICE.

PAUL WERNICKE, OF EILENBURG, GERMANY.

MEANS FOR FILLING MOLDS.

SPECIFICATION forming part of Letters Patent No. 645,986, dated March 27, 1900.

Application filed June 26, 1899. Serial No. 721,895. (No model.)

*To all whom it may concern:*

Be it known that I, PAUL WERNICKE, a subject of the King of Prussia, Emperor of Germany, residing at Eilenburg, Prussia, Germany, have invented a new and useful Improvement in Means for Filling Pressure-Molds, of which the following is a full and exact specification.

The present invention consists of improved means for filling pressure-molds and of the details of construction hereinafter set forth, and particularly pointed out in the claims.

In order to render the present specification more easily intelligible, reference is had to the accompanying drawings, in which similar letters of reference denote similar parts throughout the several views.

Figure 10:
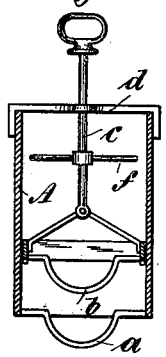
Figure 11:
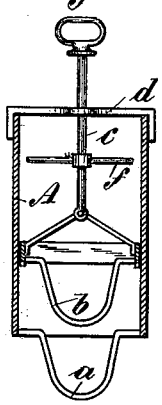
Figure 12:
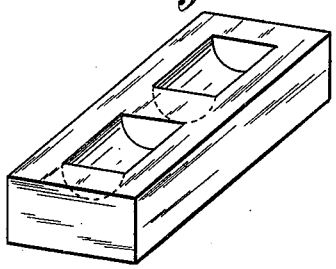
Figure 13:
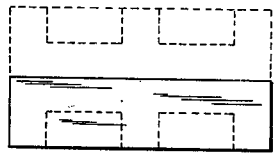
Figure 14:
Figure 15:
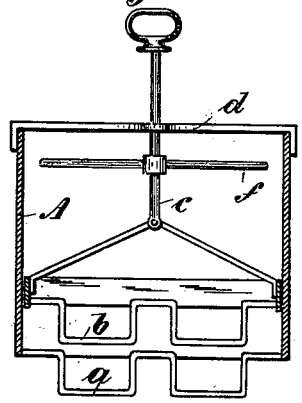
Figure 16:
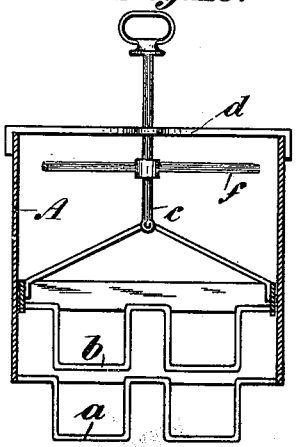
Figure 17:

Figure 1 is a diagram showing the method of filling the mold for a brick having hardened edges. Figs. 2 and 3 are vertical sections, taken in planes at right angles to each other, of the box with fast and movable sieves, the said sieves being raised. Figs. 4 and 5 are similar sections showing the sieves down. Fig. 6 is a plan of Fig. 2. Fig. 7 is a perspective view of a different form of brick or tile or the like, and Figs. 8 and 9 diagrams of the method of filling the mold to attain the said brick. Figs. 10 and 11 are vertical sections showing the formation of the sieves necessary for attaining the form of ware shown at Figs. 8 and 9. Fig. 12 is another form of brick or tile, Figs. 13 and 14 diagrams showing the filling of the mold for this form, and Figs. 15 and 16 vertical sections through two forms of filling-boxes for attaining the desired results. Fig. 17 is an end elevation of a tile, Fig. 18 diagram of the filling for the same, and Fig. 19 is a vertical section of the filling-box as designed for the said tile. Figs. 20 and 21 are vertical section and plan, respectively, of a simplified form of the invention; and Fig. 22 is a vertical section of this form of filling-box in position on the top of the mold.

Referring to Figs. 1 to 9, the object of the present invention is to distribute the material in the mold in proportionate thickness to the various parts of the object to be pressed, and this is attained by forming a sieve-bottom to the filling-box A, said bottom consisting of the profile sieves or grates $a$ and $b$, of which $a$ is fixed at the box-bottom, $b$ being vertically movable in the box by means of the bar $c$, having a handle and fixed to the frame of the sieve $b$ and extending upwardly through a cross-bar $d$ at the top of the box, its movement being limited by a collar on the bar $c$, said collar having advantageously arms $f$ extending therefrom to loosen the material as the sieve is worked up and down. The bars of the sieves fit one between the other, as will be seen from Fig. 3, so that when the movable sieve is down the bars will practically close the bottom of the box, as at Fig. 5. The bars are bent to the profile of the object to be pressed. Thus supposing, as at Fig. 1, it is required to provide an ordinary brick with harder sides and edges, then the box of Figs. 2 to 4 would be employed, thus distributing more material at the sides, as indicated in dotted lines in Fig. 1, so that when the die descends it, having an even face, will more compactly compress the material at the sides of the brick, as will be evident. The filling-box is placed on the top of the mold, as is indicated in connection with another form of the invention in Fig. 22, and the movable sieve worked up and down until the mold is sufficiently full. If it is required to form a brick or tile, as shown at Fig. 7, this may be done in two ways, as indicated at Figs. 8 and 9. The former figure indicates the method of filling when the recess is in the bottom of the brick—*i. e.*, is formed by a projecting part of the mold—in which case, as will be evident, the material will be compressed in proportion to the thicknesses of the brick at the various points. If the depression is formed by a projection of the die, the filling-box of Fig. 11 would be employed in the manner indicated in Fig. 9, the bends of the sieve-bars being in this case deeper, so as to produce the same result as the projection of the mold, together with the shallow bends of the sieve in Fig. 10, would produce in the case of Fig. 8.

In Figs. 12 to 16 double bends are employed to produce double depressions on the top or bottom of the brick, the method being analogous to that of Figs. 8 to 12.

Fig. 17 shows a tile of a class very generally employed just at present, and Fig. 19 shows the form of the sieve-bottom of the filling-box to suit the production of such tile.

Figure 18:
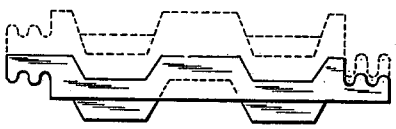
Figure 19:
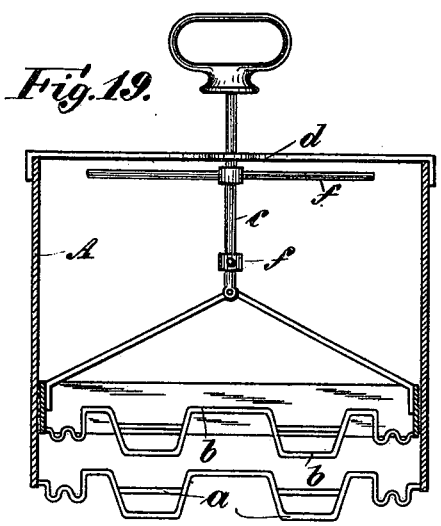

In Fig. 18 the dotted lines indicate the material before compression.

From all the foregoing figures it will be clearly seen that the material is distributed in the mold at a thickness about double that of the various parts of the pressed ware after compression, so that articles formed by the present filling device will be substantially uniform in quality throughout, or they may be made harder at any desired parts, as may be required. When the filling operation has been completed, the movable sieve is lowered to come into alinement with the fixed sieve, thus practically forming a full bottom, so that the mold may be removed from underneath the filling-box and an empty mold substituted therefor.

In Figs. 20 to 22 a simplified form of the invention is employed, in this case a profile sieve being formed in the bottom of the box and the movable sieve being omitted. B indicates the profile sieve, and the filling-box is placed over the mold C, as shown at Fig. 22, the material being shoveled into the box and falling through the sieve into the mold. When the latter is full, the material may be brushed through the pores of the sieve by means of a brush or other means, or this may take place during the filling to prevent the pores becoming clogged up. If then the upper surface of the material is somewhat compressed or stamped, the material will set fast in the pores of the sieve and the mold on being removed will be found to be filled with material having an upper surface corresponding to the profile of the sieve, as indicated in the drawings.

I claim as my invention—

1. A box for filling molds having at the bottom a profiled grate or sieve, to correspond to the various thicknesses of the ware to be subsequently pressed in the manner and for the purpose substantially as described.

2. A box for filling molds having a fixed grate at the bottom and a movable grate to pass between the bars of the said fixed grate, said grates having a profile corresponding to the various thicknesses of the ware to be subsequently pressed, in the manner and for the purpose substantially as described.

3. A box for filling molds having a fixed profiled grate at the bottom and a vertically-movable grate to fit into said fixed grate when lowered, and means in connection with the said movable grate to move the same up and down in the manner and for the purpose substantially as described.

In witness whereof I have hereunto set my hand in presence of two witnesses.

PAUL WERNICKE.

Witnesses:
MORITZ SPREER,
RUDOLPH FRICKE.